United States Patent [19]
Gal-Or et al.

[11] Patent Number: 5,782,431
[45] Date of Patent: Jul. 21, 1998

[54] THRUST VECTORING/REVERSING SYSTEMS

[76] Inventors: Benjamin Gal-Or; Michael Lichtsinder; Valery Sherbaum, all of Technion—Israel Institute of Technology, Haifa, Israel, 32000

[21] Appl. No.: 516,870

[22] Filed: Aug. 18, 1995

[51] Int. Cl.⁶ .................................................. B64C 15/02
[52] U.S. Cl. .................... 244/52; 244/110 B; 239/265.11
[58] Field of Search .............................. 244/49, 52, 53 R, 244/110 R, 23 D; 239/265.11–265.33; 60/230, 226.2

[56] References Cited

U.S. PATENT DOCUMENTS

| | | | |
|---|---|---|---|
| 2,950,595 | 8/1960 | Laucher et al. | 239/265.31 |
| 3,113,428 | 12/1963 | Colley et al. | 239/265.27 |
| 3,344,604 | 10/1967 | Mattia et al. | 239/265.27 |
| 3,515,361 | 6/1970 | Blackburn | 244/52 |
| 3,618,323 | 11/1971 | Needham | 60/230 |
| 3,685,737 | 8/1972 | Ronald | 239/265.29 |
| 3,743,184 | 7/1973 | Mancus | 60/230 |
| 4,356,973 | 11/1982 | Lawson | 60/226.2 |
| 4,667,899 | 5/1987 | Wedertz | 244/49 |
| 4,838,502 | 6/1989 | Piwson | 244/49 |
| 5,511,745 | 4/1996 | Faupell et al. | 239/265.19 |

*Primary Examiner*—Galen L. Barefoot
*Attorney, Agent, or Firm*—Donavon Lee Favre

[57] ABSTRACT

The invention provides alternative flight control methods and structures which can prevent a crash of a passenger or a cargo aircraft under stall/spin and adverse flight conditions, failing Conventional [aerodynamic] Flight Control [CFC], low landing speeds, asymmetric icing and partial loss of propulsion. That air-safety capability is provided by integrating roll-yaw-pitch engine-nozzle-nacelle thrust vectoring flight control [TVFC] retractable/rotatable vane-doors, collectively operated in individual TVFC-sectors, with modified [conventional] thrust-reversing [TR] door-structures [in one method], or with novel retractable/rotatable TR vane-door sectorial structures [a second method] to form various TVFC/CFC/TR systems. The methods and structures are intended for transport jets, except one configuration which is intended for turbo-prop transports. Another configuration replaces heavy and complex conventional TR doors and TR-nacelle-grids with an integrated, simpler and lighter TVFC/CFC/TR-systems.

18 Claims, 4 Drawing Sheets

THRUST VECTORING/REVERSING SYSTEMS

BACKGROUND OF THE INVENTION

1. Field of the Invention

Many lives can be saved and much damage prevented by a new aircraft technology called roll-yaw-pitch Thrust Vectoring Flight Control [TVFC].

From its early inception we have been involved with concept design, patents, jet-laboratory testing and sub-scale flight testing of roll-yaw-pitch TVFC. And this application is, in part, filed due to the supportive attitude of the U.S. Department of Transportation/FAA, NASA and leading U.S. engine and airframe companies to our proposal to convert, adapt and modify military TVFC technology to civil transport applications which are specifically aimed to reduce the frequency and damage of air catastrophes.

Many air catastrophes are caused by the limited capability of conventional Aerodynamic Flight Control [AFC] to a priori prevent them or to actively save doomed passenger, business, and cargo jet transports during take-off, flight and landing under adverse conditions involving stall/spin, asymmetric icing, wind-shear/microbursts, partial loss of AFC and engines, total loss of all hydraulics, tire explosions and front-wheel collapse. Similar catastrophes are encountered by turbo-prop aircraft. Other catastrophes involve the loss of tail rotor or tail during helicopter flight.

2. Object of the Invention

The invention relates to a family of retractable pitch, yaw/pitch and roll-yaw-pitch TVFC methods and systems, with and without thrust-reversing [TR] methods and systems.

Its first purpose is maximization of air safety and energy saving in operating transport jets, turbo-props, helicopters and other, jet-generating vehicles.

The integrated TVFC/TR methods and systems of the present invention are equally aimed to minimize installation complexity, weight and cost while allowing, under adverse conditions, the highest air-safety levels feasible in comparison with those extractable from conventional AFC means.

In its deployed TVFC mode of operation, it is intended for catastrophic failure prevention. In its retracted mode it does not interfere with engine/nacelle/airframe aerodynamics. The retracted mode is therefore intended for cruise flight and for conventional altitude changes with minimal fuel consumption.

An important purpose of the invention is to provide alternative flight control when AFC fails, or fails to function safely.

Another aim is to save an otherwise doomed aircraft whose AFC elements have failed, or whose all airframe hydraulics/actuators are not functioning, or one or more of its engines is inoperative, or has separated, or the vehicle is subjected to adverse flying conditions such as stall/spin, asymmetric icing, and wind-shear/microbursts.

The object of the invention is also to provide the pilot with an improved capability to rapidly correct his mistakes under adverse takeoff, flight and landing conditions.

In using one of the specific system configurations of the invention the loss of helicopter's tail or tail rotor may prevent a catastrophe by reducing the gas-turbine nozzle cross-sectional area and providing anti-rotation moment by reverting to auto yaw TVFC mode of operation of the present invention.

Similar, but more integrated and effective TVFC/TR/AFC modes of emergency operation, are provided by the invention for preventing turbo-prop transport catastrophes.

In applying one of the preferred TVFC/TR/AFC system configurations of the invention to jet transports, the heavy, complex and costly conventional TR doors/rods/hinges, retracting/sliding gear, actuators and TR-grid-nacelle-structures can safely be removed and cost-effectively replaced with a simpler and lighter-weight add-on TVFC/TR kit system. Another aim of the invention is to allow TVFC/TR-induced short landing via reduced minimum control approach speed to be followed by conventional, post-touch-down TR. All implementations and installations of present-invention-related structures and flight-control means are designed to take place without any change to the engine itself.

Another purpose of the invention is to provide methods and structures to produce low-cost, low-weight, retractable/integrated, TVFC/TR add-on kits for upgrading extant vehicles and for improved design, construction and operation of new, cost-effective ones.

A final purpose of the invention is catastrophic failure and crash prevention in gas-jet or liquid-jet based air, land and marine applications, including water-jet based vehicles. More specifically it also means to thrust-vector surface sliding, out-of-conventional control, ground and sea vehicles to prevent collision and crash.

3. Prior Art

No modern jet engine can function with prior-art rocket-engine thrust-vectoring-nozzle mechanisms and methods. Rocket-type nozzles fail during the typical prolonged operations which characterize jet engines, namely, thousands of hours, instead of minutes. Moreover, unlike the fixed, and highly divergent, internal duct shape of the rocket-nozzle, that of advanced supersonic jet-engine nozzles is made to geometrically vary internally with throttle change and flight conditions. Consequently, all rocket-TVFC-nozzle prior art is inherently irrelevant and useless with respect to the present invention.

Prior art related mainly to military uses of two-dimensional, thrust-vectoring-nozzles is available in Israeli Patent Application 80532 [filed on Nov. 7, 1986 by Gal-Or].

The present invention is partially related to the roll-yaw-pitch TVFC methodologies of Israeli Patent Application No. 111265 [filed on Oct. 12, 1994 by Gal-Or, Lichtsinder and Sherbaum].

However, unlike the present invention, the 1994/111265 application does not provide the design and operational methods as well as the specific TVFC-structures of retractable TVFC/TR-configurations for the aforementioned uses.

The 1986/80532 invention is based on two-dimensional external-flap-type, split-type roll-yaw-pitch or non-split-type yaw-pitch TVFC-nozzles. It too does not provide the design and operational methodology, TVFC-means and stowed-away/actuation/rotations of retractable TVFC/TR-configurations of the present invention.

By method, use, mechanical structure and operational means of specific and preferred retractable TVFS/TR integrated system configurations, the present invention is entirely different from prior art and not obvious to someone skilled in prior TVFC, TR, and AFC art, as clearly reflected by more than 400 papers and patents reviewed by:

1—Gal-Or, B., International Journal of Turbo and Jet Engines, Vol. 1, pp. 183–194 [1984], with 103 references to prior art related to TVFC and TR.

2—Gal-Or, B., "*Vectored Propulsion, Supermaneuverability avid Robot Aircraft*", Book published by Springer Verlag, N.Y., Heidelberg, 1990, 1991, with 237 references to prior art related to TVFC, TR and conventional AFC.

3—Gal-Or, B., International Journal of Turbo and Jet Engines, Vol. 11, No. 2–3, pp. 1–21 [1994], with 367 references related to prior art related to TVFC and TR.

4—Gal-Or, B., "*Multiaxis Thrust Vectoring Flight Control Vs Catastrophic Failure Prevention*", Reports to U.S. Dept. of Transportation/FAA, Technical Center, ACD-210, FAA X88/0/6FA/921000/4104/T1706D, FAA Res. Grant-Award No: 94-G-24, CFDA, No. 20.108, Dec. 26, 1994, May 30, 1995, with 410 references related to prior art related to TVFC, TR and air-safety methodologies.

SUMMARY OF THE INVENTION

While aimed mainly for air uses based on gas-turbines, the methods and resulting structures of this invention are also intended for land and marine applications, including those based on liquid jets, such as water-jet based vehicles.

In its deployed TVFC mode of operation, it is intended for catastrophic failure prevention. In its retracted mode it does not interfere with engine/nacelle/airframe aerodynamics. The retracted mode is therefore intended for cruise flight and for conventional altitude changes with minimal fuel consumption.

Air-safety capability is provided by integrating roll-yaw-pitch engine-nozzle-nacelle thrust vectoring flight control [TVFC] retractable/rotatable vane-doors (thrust vectoring control means), collectively operated in individual TVFC-sectors, with modified [conventional] thrust-reversing [TR] door-structures [in one method], or with novel retractable/rotatable TR vane-door sectorial structures [a second method] to form various TVFC/CFC/TR systems. The methods and structures are intended for transport jets, except one configuration which is intended for turbo-prop transports. Another configuration replaces heavy and complex conventional TR doors and TR-nacelle-grids with an integrated, simpler and lighter TVFC/CFC/TR-systems.

Unlike CFC, TVFC does not depend on the external aerodynamic flow regime. Hence, the major advantage of the invention is the provision of significantly higher air safety potentials in comparison with existing aircraft CFC.

The invention can be used to upgrade existing CFC/TR-based civil and military aircraft, or design new TVFC/CFC/TR ones. The integrated TVFC/CFC/TR systems are intended to minimize total/integrated installation weight and cost.

The description provided in the text and drawings of this application shall not be construed as limiting the ways in which this invention may be practiced but shall be inclusive of many other variations that do not depart from the broad interest and intent of the invention.

A BRIEF DESCRIPTION OF THE DRAWINGS

FIG. 1 depicts a cut through the axis of a typical turbo-fan engine equipped with configurations-1, -2 and -3 types of TVFC/TR vanes/doors of the present invention. Item 1 represents a nozzle-nacelle's aft section during conventional, non-vectoring, TR of fan-air. Item 2 represents a nozzle-nacelle's aft section during conventional non-vectoring, TR of core-gas. Item 3 is the inner nacelle's skin in the fan-air section. Item 4 is the inner engine/ nacelle's skin in the core-gas section. Item 5 represents an internal TR structure/grid exposed as depicted during downstream, TR slide-motion of 1 and/or 2. Item 6 represents an integrated TVFC/TR vane/door, during a configuration-1 type of TR. Item 7 represents an available TR rod pivoted to 3 or 4, and to 10. Item 8 represents an added structure to transfer TVFC/TR forces/moments to engine non-rotating structures. Item 9 represents configuration-2 type TVFC/TR vanes/doors in a reclined/ deployed position, and 9' at its retractable, stowed-away, non-operative position. In position 9 it individually, or collectively [as in Israeli Patent Application No. 111265], vectors the jet-engine thrust, or, optionally, by rotating it 90 degrees to one direction from the non-vectoring, streamwise/axial position depicted, and collectively, with all the other vanes/doors, back-deflects the axial thrust force by approximately 135 degrees.

Cross-view A—A is depicted in more details in FIG. 2.

These items are replaceable by other types of conventional actuators/mechanisms which can provide similar combined rotations and structural support.

FIG. 2 depicts a vane/door system, as related to cross-view A—A in FIG. 1. A similar system operates on the hot-core-flow. Item 10 represents a bulge/locker/pivot firmly attached to the lower edge of vane/door 6 and pivoted to rod 7 irrespective of vane/door rotation to, say, orientation 6'. Item 11 represents an arresting/locking groove mechanism in the skin structures of 3 and 4, suitable to arrest bulge/ pivot/locker 10. In that position, 10, 12, 15, 16, 16', the skin structures 3 and 4, rod 7 and structure 5 transfer TVFC/TR forces and moments to the jet-engine/transport structures. Item 12 represents a vane/door hinge rotatable inside a bearing sleeve 16' and firmly linked to a vectoring moment arm 13. By means of bearing-sleeve 16', and rails 15, it is also linked to the nacelle's aft section 1 or 2, and, thereby, to structure grid 5 and to engine non-rotating parts. Item 13 represents a thrust-vectoring moment arm. Item 14 represents a three-degrees-of-freedom pivot linked to 17 and 13. Item 15 represents a pair of axially-oriented locking rails firmly attached to the skin/body structures [not depicted] of 1 and 2. Item 16 represents two lateral/tangential sliding hinges inserted/locked inside rails 15 and firmly attached to the outside of sleeve 16'. Item 16' represents an external sleeve inside which 12 rotates. 16' is also back-connected by a pivot to an axially pushing/pulling deploying/retracting actuator [not depicted]. Item 17 represents a flexible, three-degrees-of-freedom TVFC/TR sectorial ring/rod which, with deploying/retracting rod 7, collectively rotates/moves/ lowers vectoring/reversing vanes/doors into position. Items 13, 14, and 17 are replaceable with individual TVFC/TR motors/actuators [see also 20 below] whose rotating mechanism is attached to hinge 12, and its static parts are firmly attached/supported by sleeve 16'.

These items are replaceable by other types of conventional actuators/mechanisms which can provide similar combined rotations and structural support.

FIG. 3 depicts a Configuration-2 type system. Item 18 represents the radial hinge of vane/door 9. Item 19 represents a flexible deploying/retracting sleeve-ring-sectorial rod/bearing which, at any crossing pass with a vane/door 9, forms a sleeve-bearing around 18. It is rotatable inside 21 by sector actuator 22 and arm 24. Its rotation deploys vane/door from retracted position 9' to TVFC/TR position 9, or back to 9'. Item 20 represents a TVFC/TR individual motor/actuator, or a common sectorial rotating-arm-actuator, controlled by the aircraft TVFC/TR commands. It is non-operative in its stowed-away position 20'. Item 21 represents a non-rotating plate or flange supported, at least in two locations per sector, by structure 8. It contains, at least in the aforementioned two locations, sleeve-bearings for 19. Item 22 represents a retracting/deploying sectorial actuator. Item 23 represents firm links of 8 with 21. Item 24 represents a sectorially-commanded retracting/deploying moment arm of item 19. Item 25 represents a non-bulging hinged spring-cover for the rectangular openings in skin structures 3 and 4.

The aforementioned rods/hinges/bearing-sleeves and actuators are replaceable by similar other types of conventional actuators/mechanisms which provide the combined required rotations and structural supports.

FIG. 4 depicts a Configuration-3 type system. Each vane/door includes a non-rotating upper sub-vane/door 26 for partial flow-blocking and the generation of jet-efflux-acceleration. 26 is firmly attached to sleeve 16' and hinge 12 of each vane/door 9 passes through the center of 26. The resulting system is positioned inside nozzle-exits of turbo-prop gas turbines and helicopters for effecting flow-acceleration and TVFC during emergency.

This mechanism is replaceable by other types of conventional actuators/mechanisms which provide similar combined rotations and structural supports.

These Figures shall not be construed as limiting the ways in which this invention may be practiced but shall be inclusive of many other variations that do not depart from the broad interest and intent of the methods and structures of the invention.

DETAILED DESCRIPTION OF THE INVENTION

Method 1

This control method relates to retracting/deploying thrust-vectoring/reversing vanes/doors in gas-turbine operated vehicles and fluid-jet operated systems, comprising the mixed/optional steps of:

Grouping vanes/doors of thrust-vectoring/reversing type in sectors according to their yaw, roll, and pitch thrust-vectoring orientations with respect to the vehicle/system.

Connecting and linking/pivoting each of these vanes/doors/sectors with sectorially-commanded thrust-vectoring/reversing motors/actuators.

Deploying these vanes/doors/sectors from their thrust-vectoring/reversing stowed position into the nozzle flow considered, while simultaneously rotating each.

Positioning by this deployment/rotation each of said vanes/doors at minimal drag orientation parallel to local flow at zero reference angle for thrust-vectoring.

Vectoring thrust in the aforementioned roll-yaw-pitch coordinates by sectorially-commanding rotations of said vanes/doors away from said zero reference angle.

Retracting/rotating said vanes/doors back to said stowed position.

Splitting said nozzle flow by asymmetric yaw, pitch or yaw/pitch deploying of a fraction of available conventional thrust-reversing doors and/or said vanes/doors/sectors without rotation, until effecting a partial nozzle-flow blocking, thereby forcing part of said flow through external/peripheral gaps/openings or grids in radially-out/upstream direction for providing coarse/emergency thrust-vectoring.

Reversing thrust by symmetric conventional deploying/sliding methods involving all said vanes/doors functioning as conventional thrust-reversing doors without simultaneous rotation.

Method 2

This method relates to post-nozzle TVFC/TR. It allows total rejection/removal of all heavy, complex and costly conventional TR structures and replacing them with low-weight/low-cost TVFC means. It comprises the mixed/optional steps of:

Deploying all or some of the TVFC/TR vanes/doors radially outward from a forward-pointing, stowed-away position inside the nacelle structure, to a flow-parallel zero TVFC reference angle downstream of engine/nacelle nozzle-end.

That deployment is conducted collectively in annular TVFC/TR sectors, each deploying radially-out into post-engine-nozzle axial flow position without the need to simultaneously rotate the vanes/doors as in Method 1.

Rotating all or only an asymmetric fraction of the vanes/doors in a common direction until a flow-blocking blocking position, thereby forcing all or the asymmetric part o the flow through the gap between nozzle-end and upper-end of the deployed vanes/door/sectors.

The vanes/doors are collectively and rapidly rotating/vectoring engine flow in annular sectors by means of individual or collective sectorial motors/actuators/rods (actuator means) which, in turn, are linked with engine's non-rotating structures for effecting TVFC or TR without the conventional TR methods and structures.

Method 3

Here the TVFC mode of control is applied to axially-oriented gas-turbine nozzles of turbo-props, and tail-damaged or tailless helicopters. It comprises the mixed/optional steps of:

Adding a non-rotating, laterally-oriented, sub-vane/door to each of said vanes/doors thereby forming split-type vanes/doors which, upon radial deployment reduce effective nozzle-cross-sectional area to provide accelerated nozzle flow for sufficient TVFC forces/moments. Performing thrust vectoring flight control as in Method 1 or 2.

Retracting said vanes/doors back to their said stowed position for providing fuel saving during conventional altitude changes and cruise flight, as in Method 1 or 2.

Method 4

This asymmetric/symmetric, TVFC/TR method introduces low-weight, low-cost, simply-shaped, semi-cylindrical nozzle or nozzle/nacelle ducting peripheral skin-sectors into nozzle's internal skin and/or onto nacelle's post-nozzle skin. In its deployed mode these skin-sectors act as TVFC/TR flow-blocking/vectoring objects. For instance, such two yaw and two pitch TVFC/TR retracting/deploying skin-sectors, having no said vanes/doors, are capable of splitting/deflecting part of the flow into a radial/yaw, radial/yaw/pitch or radial/pitch direction for providing coarse yaw/pitch TVFC. Without retractable sectorial dividing radial walls the remaining flow may be slightly distorted and only roughly axially-oriented.

Upon symmetric deploying of all, say, four skin-sectors a radially-out/upstream orientation, pure TR is effected. Otherwise all, say, four sectors are retracted to form smooth skins, say, post fan or core nozzles. Alternatively, just three or four deployable, simple internal nozzle skin sectors provide coarse yaW/pitch TVFC without TR to turbo-prop transports and tailless or tail-damaged helicopters. Retractable TVFC/TR eye-lids/paddles may replace skin-sectors. This motion control method may also provide coarse yaw-only or pitch-only thrust vectoring by employing only two deploying/retracting sectors of the eye-lid/paddle type of thrust reversing and each time deploying only one of them at controlled angles into the nozzle flow.

This method comprises the following mixed/optional stages:

Selecting yaw and pitch thrust-vectoring retracting/ deploying orientation for the required skin sectors with respect to the vehicle/system Splitting internal nozzle's skin and/or post-nozzle nacelle's skin into radially deployable, said skin sectors according to said yaw and pitch selection Vectoring thrust by deploying only an asymmetric fraction of said sectors from their skin-stowed position to a radially-in nozzle position and radially-out/upstream inclined vectoring/reversing position Reversing thrust by deploying all said post-nozzle sectors from their skin-stowed position into a common radially-out/upstream orientation Retracting all said sectors to form a smooth nozzle skin and/or smooth nacelle skin Optionally one can maintain by this method a coarse/emergency TVFC by asymmetrically deploying into said flow one or more post-nozzle-sector-eye-lids/paddles at controlled angles, with or without installed said vanes doors onto its/their skin structures. By symmetric deployment of all said eye-lids/paddles one can force flow through external/ peripheral gaps/openings in radially-out/upstream direction for providing pure TR.

Figure 1:
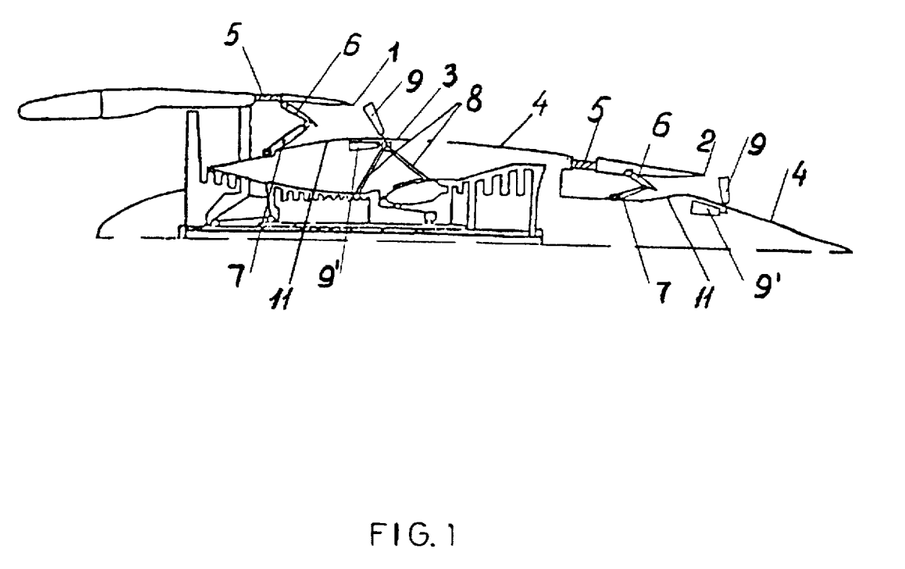

Configuration 1: This system/structure is specifically designed according to Method 1 to upgrade extant transport jets which are already equipped with conventional TR doors, as depicted in FIG. 1.

The available conventional TR-doors are to be re-hinged, re-supported, re-locked and re-deployed/retracted. The resulting TVFC/TR doors are therefore referred to as vanes/ doors. These vanes/doors can now deflect engine fan and/or core flows to maximize TVFC-induced air safety, and/or operate as TR doors with already available, on-board, conventional TR hardware.

When available as add-on kits, this configuration is expected to add little weight and cost to extant or new transport jets.

Figure 2:
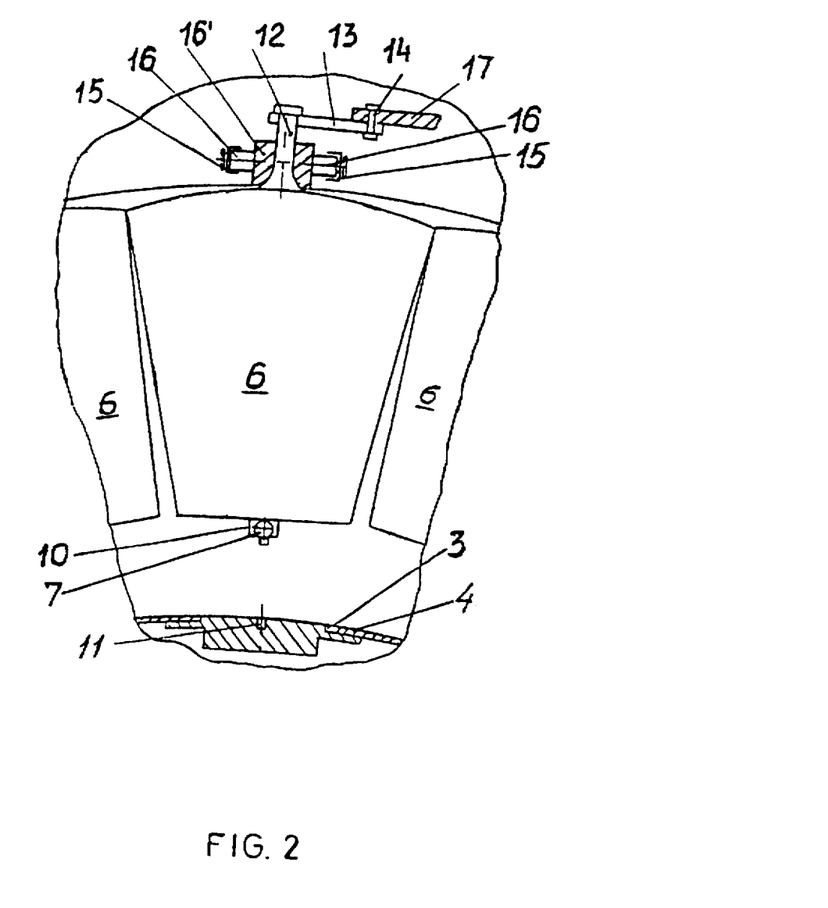

Configuration 1 is mainly based on items 6, 6', 7 and 10 to 17 depicted in FIG. 2. Each vane/door 6 is rotatable by hinge 12 and arm 13 up to about 90 degrees as it is deployed into its TVFC position, or retracted back to its stowed TR position under the skin structures of nozzle-nacelle 3 and/or 4.

Its hinge 12 rotates inside the sleeve of bearing-sleeve 16'. The sleeve of 16' is firmly attached to two opposing lateral/ tangential hinges 16. That sleeve is also pivoted to a push/pull axially deploying/retracting actuator [not depicted].

In turn, the two hinges 16 are inserted/locked inside a pair of axially-oriented sliding rails 15, and these rails are firmly attached to the engine/nacelle's fan and/or core aft structures 1 and/or 2.

This hinge/bearing-sleeve/rail system provides simultaneous deployment and rotation to each vane/door 6 as it rotates through orientation 6' to a parallel orientation with respect to the local flow direction, or, via retraction/rotation back into the conventional TR stowed position/ configuration. Thus, two simultaneous motions are performed by the axial motion of bearing-sleeve 16' and the rotation of 12 by means of arm 13 and a flexible, three-degrees-of-freedom TVFC-rod mechanism 14 and 17. Flexible sectorial ring/rod 17 is linked to TVFC-actuators [not depicted].

Alternatively, each vane-door can be rotated and TVFC-operated by other means, such as an individual motor/ actuator which performs sectorially-common TVFC-commands.

The lower-edge bulge/pivot 10 of each vane/door 6 is pivoted to TR rod 7, which, in turn, is also pivoted to the inner nacelle's skin structure 3 and/or 4.

The combined axial motion of 16' with about 90 degrees rotation of 12 while 10 is also linked to 7, radially 'lowers'/ deploys/rotates vane/door 6 into an arresting/locking groove 10, which, in turn, absorbs part of the forces/moments during TVFC operation. TVFC operation may be available from both partial and completely deployed/locked positions of vanes/doors 6. It is normally performed without operating the conventional TR mechanism. However, landing may be considered with high power settings and combined/partial TVFC/TR for reduced minimum control speed options.

All vanes/doors 6 are grouped into TVFC-sectors and/or effective nozzle-area reduction sub-sectors, which, in turn, are controlled collectively by flexible ring/rod 17 and/or alternative motor/actuators. Flexible ring/rod 17 is pushed/ pulled by a sectorial TVFC motor/actuator. The cross-section of each vane/door 6 is close to an aerodynamically symmetric thin shape, with a slight deviation from symmetry on the TR upstream face.

That face may be almost flat for extracting improved TR blocking.

The TVFC-sectors are each independently actuated to deflect or block part or the entire fan and/or core flows in roll, pitch, yaw or axial coordinates of the aircraft. TR is performed in the conventional way by axially sliding 1 and/or 2. Vane/door 6 is then deployed or retracted, without simultaneous rotation, by the sliding motion of 1 and/or 2 while its lower-edge/bulge/pivot 10 is firmly held by rod 7.

Configuration 2: This structure/system considerably reduces the complexity, weight and cost of Configuration 1 by first removing all heavy, complex and costly conventional TR doors, rods, actuators and grid-structures from the transport, while providing different roll-yaw-pitch TVFC vanes/doors. It is designed according to the principles of Method 2.

Figure 3:
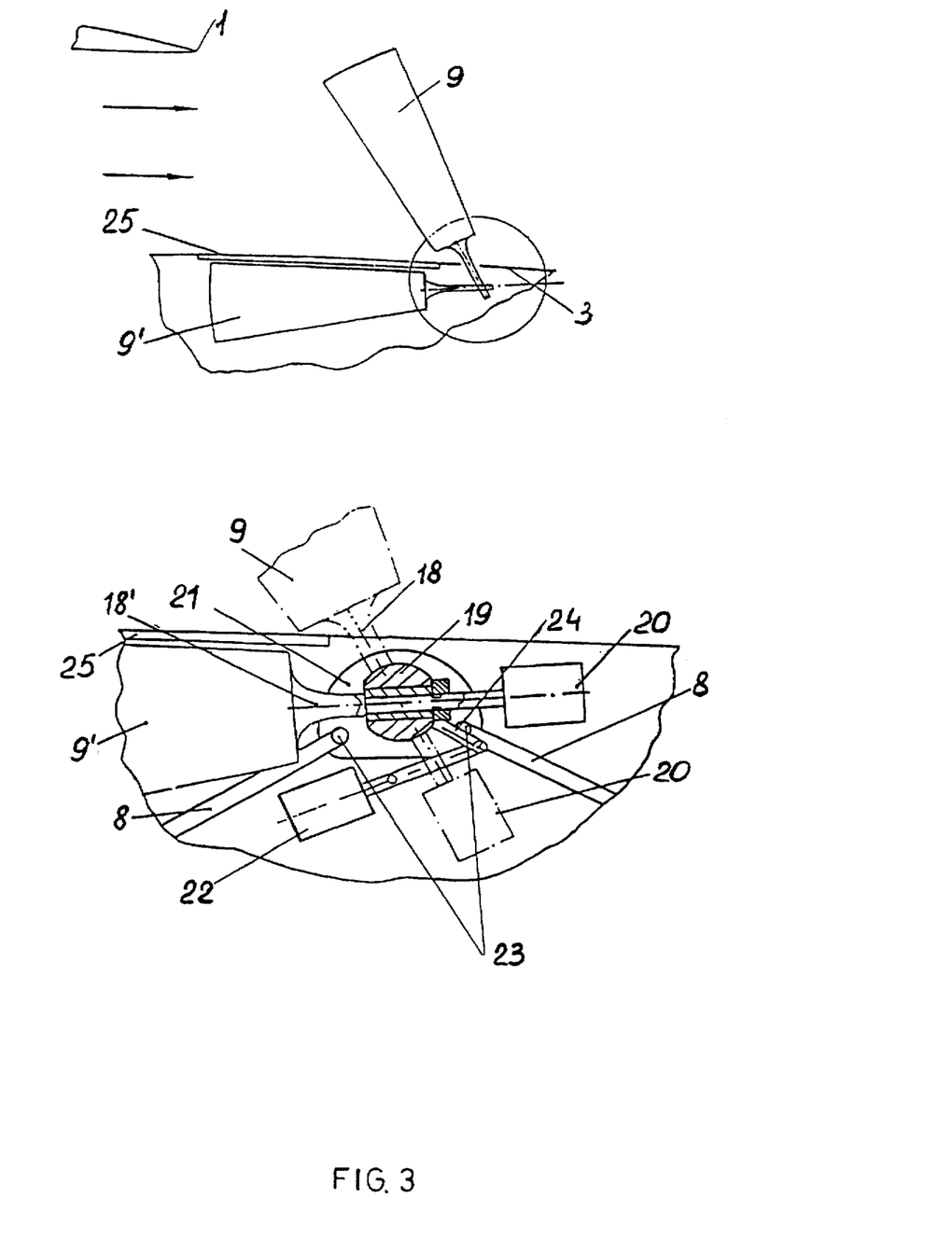

In its non-operative mode this configuration is stowed-away [FIGS. 1 and 3, items 9' and 20'] by being positioned under the inner nacelle's metal skin structure 3 and/or 4.

In its operative mode it is deployed into position 9 and 20. During TVFC operation its vanes/doors 9' are deployed by means of links and motors/actuators 18, 19, 21, 22 and 24. These vanes/doors are deployed at some distance 9 downstream of the fan and/or core nozzle exits, 1, 2, and are inclined into the flow-upstream direction to allow TR upon a collective 90 degrees rotation of all TVFC-doors from zero reference angle to form a TR cone-cap.

This cone-cap blocks most fan and/or core flows, and forces the flows upstream and radially-out through the gap between engine-nozzles exits 1 and 2 and vanes/doors upper edges, or their tangential upper shrouds [not depicted].

During TVFC these vanes/doors are rotatable in either direction by means of individual or collective motor/ actuators 20, and these motor/actuators and hinges are linked, by 21, 24 and 8, with engine non-rotating structures. Vanes/doors 9 are sectorially-commanded by means such as sectorial TVFC-mechanisms 18, 19, 20, 22 and 24. 9 may be positioned/deployed or retracted by flexible ring rod/sleeve 19, which is rotatable by a common sector actuator 22 and moment arm 24. This rod/sleeve rotates inside a bearing positioned on plate 21, which, in turn, comprises links 24 with structure 8. Structure 8 is firmly linked to fixed engine sections/parts.

Alternatively, each vane/door 9 is rotated by an individual motor/actuator 20', and each motor/actuator 20' is individually controlled by the transport TVFC computer system. Vanes/doors 9 can be tangentially toped by sectorial shrouds, arrested in place by radial-top hinges [not depicted], so as to minimize vibration/stress during operative TVFC/TR modes. The cross-section of each retractable vane/door 9 may be aerodynamically symmetric and thin. Spring-rotatable metal skin cover 25 helps minimizing drag in the retractable and deployed modes of operation.

Figure 4:
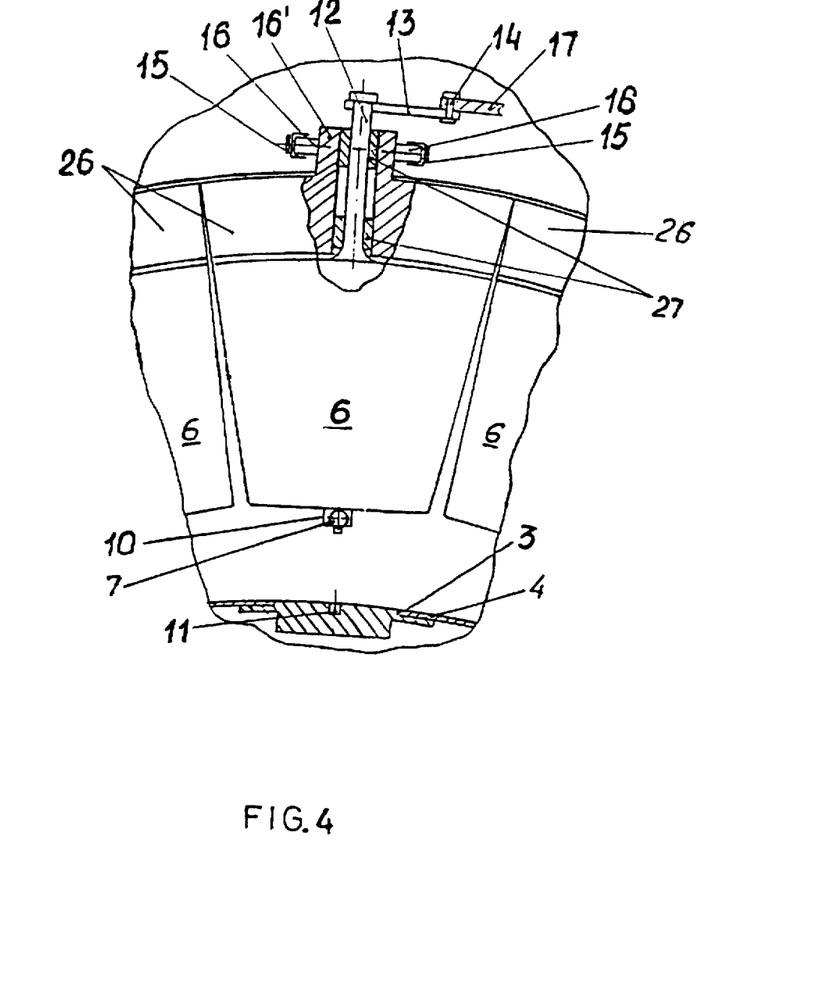

Configuration 3: This structure/system is designed for turbo-prop transports, gas-turbine operated helicopters and other jet generating systems. It is mechanically structured according to the principles of Method 3.

Since TR in turbo-props is provided by the propeller gear mechanism, this configuration eliminates the TR option. Moreover, since the exhaust nozzles of turbo-prop and helicopter engines are designed with minimum pressure-drop, relatively large diameters, the present invention provides a temporarily reduction in that effective diameter during emergency TVFC. The laterally-fixed sub-vane/door 26 in FIG. 4 characterizes such applications. The resulting split-type vane/door 6/26 replaces the previously used non-split type vanes/doors 6 of FIG. 2. It is intended to provide turbo-prop transports and helicopters with TVFC-induced air-safety capabilities.

Here the TR options of configuration 1 are absent, and each of the vanes/doors includes an additional, non-rotating upper sub-vane/door for partial flow-blocking and the generation of jet-efflux-acceleration [Fig. 4 item 26]. The lateral/tangential sub-vane/door 26 is firmly attached to sleeve 16' of the bearing-sleeve, and the hinge of vane/door 6 passes through the radial center of sub-vane/door 26 and is held in place by bearing-sleeves 27. The resulting system is positioned at axially-oriented nozzle-exits of turbo-prop and helicopter gas-turbines for effecting flow-acceleration with simultaneous TVFC, with or without AFC.

We claim:

1. The method of controlling motion by thrust-vectoring control means inside nozzles of gas-turbine operated vehicles and fluid-jet operated systems, comprising the steps of:
    a. Grouping radially-oriented thrust vectoring control means of low drag shape in sectors according to their yaw, roll, and pitch thrust-vectoring orientations with respect to the vehicle/system;
    b. Connecting each of said sectors of thrust vectoring control means with sectorially-commanded thrust-vectoring actuators;
    c. Deploying said sectors of thrust vector controlling means from their thrust vectoring stowed position into said nozzle flow, while simultaneously rotating each said thrust vectoring control means;
    d. Positioning by said deployment each of said thrust-vectoring control means at minimal drag orientation parallel to local flow at zero reference angle for thrust-vectoring;
    e. Vectoring thrust in said roll-yaw-pitch coordinates by sectorially-commanding rotations of said thrust vectoring control means away from said zero reference angle;
    f. Retracting said thrust vectoring control means back to said stowed position;
    g. Splitting said nozzle flow by asymmetric deploying of a fraction of available conventional thrust-reversing doors and/or said sectors of thrust vectoring control means without rotation, until effecting a partial nozzle-flow blocking, thereby forcing pair of said flow through openings in radially-out/upstream direction for providing course/emergency thrust vectoring;
    h. Reversing thrust by symmetric conventional deploying/sliding methods involving all said thrust vectoring control means functioning as conventional thrust-reversing doors without simultaneous rotation.

2. The method of controlling motion by thrust-vectoring means in post-nozzle flows of gas-turbine operated vehicles and fluid-jet operated systems, comprising the steps of:
    a. Grouping radially-oriented thrust vectoring control means of low-drag shape in sectors according to their yaw, roll and pitch thrust-vectoring orientations with respect to the vehicle system;
    b. Connecting each of said sectors of the thrust vectoring control means with sectorially-commanded thrust-vectoring actuator means;
    c. Deploying all or some of said sectors of the thrust vectoring control means from an upstream-pointing, stowed away position downstream of flow nozzles to an upstream inclined orientation with said thrust vectoring controlling means in parallel orientation to local axial flow direction at zero thrust vectoring reference angle;
    d. Vectoring thrust in all said roll-yaw-pitch coordinates by sectorially-commanding rotations of said thrust vectoring control means away from said zero reference angle;
    e. vectoring reversing thrust by symmetric or asymmetric rotations of all or a fraction of said thrust vectoring control means in a common said roll-generating direction until all or only said asymmetric sectors block flow, thereby forcing all of said asymmetric fraction of said flow through a peripheral gap between said nozzle-end and upper end of said deployed sectors of thrust vectoring control means;
    f. Retracting said sectors of thrust vectoring control means to stowed position.

3. The method of claim 2 wherein said thrust reversing control method is canceled-out and its structure removed and the trust vectoring control mode is applied inside of or just aft axially-oriented nozzles, comprising the steps of;
    a. Adding a non-rotating, laterally-orientated sub thrust vectoring control means thereby forming split-type thrust vectoring control means which upon said radial deployment reduce effective nozzle-cross-sectional area to provide accelerated flow for sufficient thrust-vectoring flight control;
    b. Vectoring thrust in said roll-yaw-pitch coordinates by sectorially-commanding rotations of said split-type thrust vectoring control means away from said zero reference angle according to commands;
    c. Retracting said split-type thrust vectoring control means back to their stowed position.

4. The system of claim 2, wherein thrust vectoring control means and sectors are held together by an upper tangential shroud and additional upper thrust vectoring control means hinges.

5. The system of claim 2 wherein thrust vectoring control means are deployed or retracted in a radial orientation without providing a thrust-reversal mode of operation.

6. The system of claim 2, wherein said hinges of said thrust vectoring control means are inserted inside structural opening-frames of conventional eye-lid bucket type thrust-reversing means and said thrust vectoring control means are curved according to the contours of said eye-lid buckets, and the conventional retracted position of said eye-lid buckets becomes the retractable position of the resulting curved thrust vectoring control means.

7. The system of claim 6, wherein said thrust vectoring control means are applied to add thrust-vectoring capabilities to other conventional-type thrust-reversing means, and are deployed and operated when said thrust-reversing means are deployed.

8. The system of claim 2 wherein said thrust vectoring control means comprise internally-inserted telescopic-type smaller vanes, which in said retractable position, are stowed under the nacelle's skin structure, and said sub thrust vectoring control means are deployed during thrust vectoring and reversing modes of operation.

9. The system of claim 2 wherein said thrust vectoring control means and louvers are so shaped, configured and spaced as to block all flow when collectively rotated 90 degrees from the flow direction.

10. The method of controlling motion by introducing simply-shaped, semi-cylindrical, peripheral flow-ducting skin sectors into nozzle's internal skin and onto nacelle's post-nozzle skin, comprising the steps of:
  a. Selecting yaw and pitch orientations of said skin sectors with respect to the vehicle system;
  b. Splitting said skins into radially deployable sectors according to said yaw and pitch selection;
  c. Vectoring thrust by deploying only an asymmetric fraction of said sectors from their skin-stowed position to a radially-in nozzle position and radially-out upstream position;
  d. Reversing thrust by deploying all said post-nozzle sectors from their skin stowed position into a common radially-out upstream orientation;
  e. Retracting all said sectors to form a smooth nozzle skin and smooth nacelle skin;
  f. Maintaining coarse thrust-vectoring control by asymmetrically deploying into said flow one or more post-nozzle sectors of eye-lid paddle type thrust vector means at controlled angles;
  g. Symmetrically deploying all said sectors of eye-lids paddles to force flow through external peripheral openings in a radially-out upstream direction for providing thrust reversing.

11. The system of claim 10 wherein said thrust vectoring control means are contoured as doors and are synchronized to open and close with control commands.

12. A retractable roll-yaw-pitch thrust-vectoring and thrust-reversing engine-nozzle-nacelle system for use in transport jets, comprising:
  a. Retractable thrust-vectoring control means whereby each of said thrust vectoring control means is deployed from a stowed position inside said nozzle structure into engine nozzle axial flow as it also rotates around it longitudinal symmetry-line, and said rotations move said thrust vectoring control means to a radial thrust-vectoring position, whereby each of said thrust vectoring control means are oriented parallel to local axial nozzle flow direction at zero reference angle for thrust vectoring;
  b. Said thrust vectoring control means are each radially hinged at its upper edge center, and said hinge is firmly attached to a moment arm, and said hinge rotates inside a bearing-sleeve, and the sleeve of said bearing-sleeve is firmly attached to two lateral hinges, and said lateral hinges are each inserted and locked inside an axially-oriented sliding rail, and said rail is firmly attached inside said nozzle structure, and said sleeve is also pivoted to a push and pull axial actuator, and a radial bulge hinge attached to low-edge-center of each of said thrust vectoring control means is positioned inside an arresting, axial grove in the inner nacelle/nozzle skin structure, and said bulge hinge is pivoted and linked by a rod to said skin structure, and said moment arm is, by flexible sectorial pivoted-rod, attached to thrust-vectoring control actuators, and said thrust vectoring control means are collectively deployed as annular sectors, and from said reference angle, each of said thrust vectoring control means is rotatable up to 90 degrees into either direction to deflect and/or block part or the entire engine flow in roll, pitch, yaw, or forward or reversed-axial body coordinates of said engine and nacelle, and said retractable position is used during cruise flight, and said deployed vectoring position during thrust-vectoring and reversing, such as during landing, or for catastrophic failure prevention;
  c. Said thrust vectoring control means are retractable back to said stowed position;
  d. Said thrust vectoring control means are deployed into nozzle and nacelle flow without said thrust-vectoring rotation during transfer to conventional thrust-reversing operation;
  e. Said thrust vectoring control means are retracted back to stowed position without said thrust-vectoring rotation during transfer to conventional aerodynamic flight control.

13. The system of claim 12, wherein said thrust vectoring control means each includes and additional, laterally-oriented, non-rotating upper sub-thrust vectoring control means for a partial flow-blocking and jet-efflux-acceleration, and said sub- is firmly attached to the sleeve of said bearing sleeve, and said hinge of each of said thrust-vectoring control means rotates inside said sub- thrust vectoring control means and the resulting system is positioned inside tail-pipe exits of turbo-prop and helicopter engines for effecting emergency or normal thrust-vectoring flight control.

14. The system of claim 12 wherein said upper hinges of said thrust vector control means are replaced by low-end hinges, and said thrust vectoring control means are deployed at some distance downstream of nozzle and nacelle exit, and said thrust vectoring control means are retractable into a stowed-away space under the inner metal skin of the nacelle, and at said deployed position, said thrust vectoring, control means are inclined in the upstream direction to allow thrust-reversing upon rotation of all said vectoring doors, which collectively, form a flow blocking object, and said blocked flows are thereby forced upstream and radially out, and said flows thereby pass through the gap between engine nozzle nacelle exit end and end of said thrust vectoring control means upper edges, and said thrust vectoring control means are also rotatable into either direction by means of individual or collective actuator means and said actuator means are linked in their static parts, with engine's non rotating structures, and said thrust vectoring control means are collectively controlled in annular sectors and said sectors are deployed by a deploying rod-ring-sleeve-actuator, and said rod-ring-sleeve rotates inside a fixed plate flange and said plate flange is firmly attached to non-rotating engine structures, and the cross section of each of said is aerodynamically symmetric and thin.

15. The system of claim 12, wherein said thrust vectoring control means are each rotatable by an individual actuating means whose static structure is firmly attached to the outer sleeve of said bearing sleeve.

16. The system of claim 12 wherein additional peripheral louvers are laterally hinged inside covered conventional thrust-reversing grid structure, and are radially deployed simultaneously with said thrust vectoring control means when conventional nacelle's aft structures are axially sliding downstream to expose the conventional grid structure, and said peripheral louvers vector all or part of jets directly downward, upward or sideways.

17. The system of claim 12 adjusted to fit and operate inside a two-dimensional engine exhaust nozzle.

18. The system of claim 12 comprising actuators serving to rotate said thrust vectoring control means and louvers in synchronized motions with other conventional control means of the same vehicle.

* * * * *